United States Patent [19]
Ono et al.

[11] Patent Number: 5,394,765
[45] Date of Patent: Mar. 7, 1995

[54] INTERLOCK MECHANISM IN VEHICLE TRANSMISSION

[75] Inventors: Daiki Ono, Chiryu; Shinichi Kunieda, Toyota; Keiji Takeshita, Toyota; Akihiko Ikeda, Toyota, all of Japan

[73] Assignee: Aisin Ai Co., Ltd., Aichi, Japan

[21] Appl. No.: 47,178

[22] Filed: Apr. 16, 1993

[30] Foreign Application Priority Data

Apr. 20, 1992 [JP] Japan .................. 3-099881

[51] Int. Cl.$^6$ .................................... F16H 63/36
[52] U.S. Cl. ............................................ 74/477
[58] Field of Search ................................ 74/477

[56] References Cited

U.S. PATENT DOCUMENTS

| 1,537,584 | 5/1925 | Carhart | 74/477 |
| 4,633,729 | 1/1987 | Scalisi et al. | 74/477 |
| 4,633,730 | 1/1987 | Scalisi et al. | 74/477 |
| 4,800,772 | 1/1989 | Irlbacher et al. | 74/477 |

FOREIGN PATENT DOCUMENTS

| 3929270 | 3/1990 | Germany | 74/477 |
| 56-26126 | 6/1981 | Japan . | |
| 56-85124 | 7/1981 | Japan | 74/477 |

*Primary Examiner*—Allan D. Herrmann
*Attorney, Agent, or Firm*—Fisher & Associates

[57] ABSTRACT

An interlock mechanism associated with a shift mechanism for a change-speed gearing in a power transmission, the shift mechanism including a plurality of parallel fork shafts axially slidably supported from a casing of the power transmission to be selectively shiftable toward forward speed-ratio and reverse-ratio positions, wherein the interlock mechanism comprises a single interlock plate assembled with an end wall of the casing in a plane perpendicular to each axis of the fork shafts to be movable in one direction, the interlock plate having a body portion slidable along with the end wall of the easing in the one direction and a plurality of parallel projections to be selectively engaged with respective recesses formed on the fork shafts for permitting axial movement of one of the fork shafts and restricting axial movement of the other fork shafts.

3 Claims, 2 Drawing Sheets

INTERLOCK MECHANISM IN VEHICLE TRANSMISSION

BACKGROUND OF THE INVENTION

1. Field of the Invention

The present invention relates to an interlock mechanism associated with a shift mechanism for a change-speed gearing in a power transmission of an automotive vehicle.

2. Discussion of the Prior Art

In Japanese Utility Model Publication No. 56-26126 there has been proposed an interlock mechanism associated with a shift mechanism for a change-speed gearing in a power transmission of an automotive vehicle, wherein the shift mechanism includes a plurality of fork shafts arranged in parallel with each other and axially slidably supported from a casing of the power transmission to be selectively shiftable toward forward speed-ratio and reverse ratio positions, and wherein the interlock mechanism includes a single interlock plate movably assembled with an end wall of the casing in such a manner as to be selectively engaged with respective annular grooves formed on the fork shafts for permitting axial movement of one of the fork shafts and restricting axial movement of the other fork shafts.

In the interlock mechanism, the interlock plate is formed with a plurality of lock holes to be engaged with the fork shafts extending therethrough and is movable in a plane perpendicular to each axis of the fork shafts. The lock holes of the interlock plate are, however, formed in surrounding relationship with the fork shafts and arranged eccentrically to one another at their centers to permit axial movement of one of the fork shafts when engaged with the other fork shafts. Thus, the interlock plate is moved in various directions, resulting in unexpected troubles in shifting operation of the fork shafts.

SUMMARY OF THE INVENTION

It is, therefore, a primary object of the present invention to provide an improved interlock mechanism capable of avoiding the problems discussed above.

According to the present invention, there is provided an interlock mechanism associated with a shift mechanism for a change-speed gearing in a power transmission, the shift mechanism including a plurality of parallel fork shafts axially slidably supported from a casing of the power transmission to be selectively shiftable toward forward speed-ratio and reverse-ratio positions, wherein the interlock mechanism comprises a single interlock plate assembled with an end wall of the casing in a plane perpendicular to each axis of the fork shafts to be movable in one direction, the interlock plate having a body portion slidable along with the end wall of the casing in the one direction and a plurality of parallel projections to be selectively engaged with respective recesses formed on the fork shafts for permitting axial movement of one of the fork shafts and restricting axial movement of the other fork shafts.

BRIEF DESCRIPTION OF THE DRAWINGS

Additional objects, features and advantages of the present invention will be more readily appreciated from the following detailed description of a preferred embodiment thereof when taken together with the accompanying drawings; in which.

DESCRIPTION OF THE PREFERRED EMBODIMENT

Figure 1:
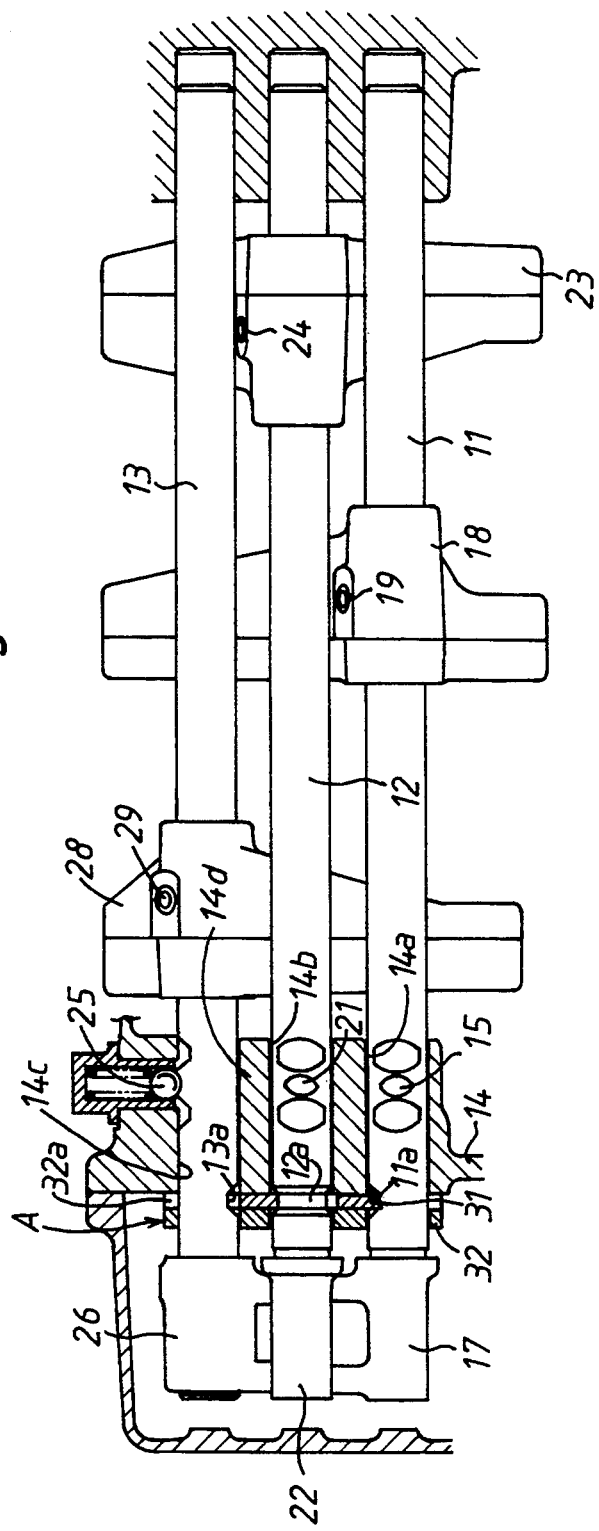
FIG. 1 is a side view, in partial section, of a shift mechanism for a change-speed gearing in a power transmission of an automotive vehicle, equipped with an interlock mechanism in accordance with the present invention.
Figure 2:
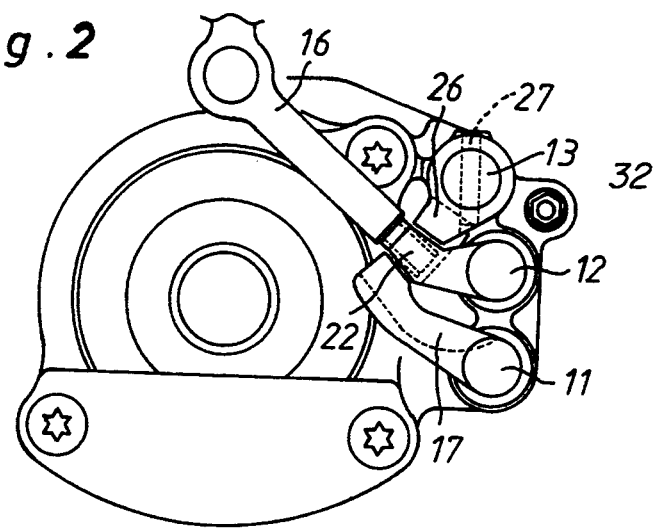
FIG. 2 is a front view showing a vertical arrangement of fork shafts shown in FIG. 1.

In FIGS. 1 and 2 of the drawings, there is illustrated a shift mechanism for a change-speed gearing in a power transmission of an automotive vehicle, equipped with an interlock mechanism A of the present invention. The shift mechanism includes three parallel fork shafts 11, 12 and 13 respectively for 1-2 speeds, 3-4 speeds and 5 speed-reverse drive which are slidably supported from a casing 14 of the power transmission at mounting holes 14a, 14b and 14c formed thereon. The fork shaft 11 for 1-2 speeds is arranged to be selectively retained by a ball-detent mechanism 15 at a neutral position, a first speed position or a second speed position. As shown in FIGS. 1 and 2, the fork shaft 11 is integrally provided at its one end with a shift head 17 to be selectively engaged with a shift lever 16 of the power transmission. As shown in FIG. 1, the fork shaft 11 has a shift fork 18 fixed thereto by means of a fastening pin 19 to be engaged with a clutch mechanism (not shown) of the power transmission.

The fork shaft 12 for 3-4 speeds is arranged to be selectively retained by a ball-detent mechanism 21 at a neutral position, a third speed position or a fourth speed position. As shown in FIGS. 1 and 2, the fork shaft 12 is integrally provided at its one end with a shift head 22 to be selectively engaged with the shift lever 16. As shown in FIG. 1, the fork shaft 12 has a shift fork 23 fixed thereto by means of a fastening pin 24 to be engaged with the clutch mechanism of the power transmission. The fork shaft 13 for 5-speed and reverse drive is arranged to be selectively retained by a ball-detent mechanism 25 at a neutral position, a fifth speed position or a reverse drive position. The component parts of the ball-detent mechanisms 15 and 21 are substantially the same as those of the ball-detent mechanism 25. As shown in FIGS. 1 and 2, the fork shaft 13 has a shift head 26 fixed thereto by means of a fastening pin 27 to be selectively engaged with the shift lever 16 and a shift fork 28 fixed thereto by means of a fastening pin 29 to be engaged with the clutch mechanism of the power transmission.

Figure 3:
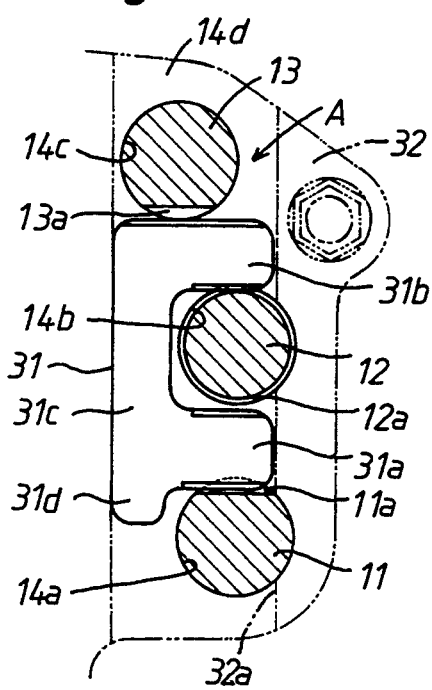
FIG. 3 is an enlarged cross-sectional view of the shift mechanism showing the interlock mechanism.
Figure 4:
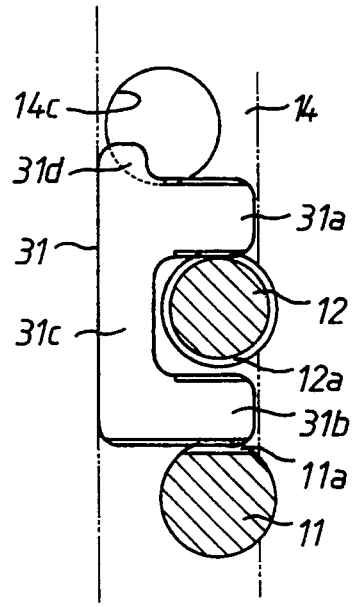
FIG. 4 depicts an erroneously assembled condition of an interlock plate shown in FIG. 3.

As shown in FIGS. 1 and 3, the interlock mechanism A includes an interlock plate 31 which is arranged to be selectively engaged with semi-circular recesses 11a, 13a repetively formed on the fork shafts 11, 13 and an annular recess 12a formed on the fork shaft 12. The interlock plate 31 is slidably disposed within a vertical groove 32a formed on a retainer member 32 in a direction perpendicular to each axis of the fork shafts 11, 12 and 13. The retainer member 32 is secured to an end wall 14d of the casing 14 by means of screws to retain a bearing (not shown) of an output shaft of the power transmission in position. As shown in FIG. 3, the interlock plate 31 has a body portion 31c integrally formed with a pair of vertically spaced parallel projections 31a, 31b and an end projection 31d. The lower projection 31a of interlock plate 31 is arranged to be engaged with either one of the semi-circular recess 11a and annular recess 12a of the adjacent fork shafts 11 and 12, while the upper projection 31b of interlock plate 31 is arranged to be engaged with either one of the annular recess 12a and semi-circular recess 13a of the adjacent fork shafts 12 and 13. As shown in FIG. 4, the end projection 31d of interlock plate 31 is arranged to be overlapped with the mounting hole 14c for fork shaft 13 formed in the end wall of casing 14 if the interlock plate 31 is erroneously assembled in a reverse direction.

In an assembly process of the interlock mechanism A, the interlock plate 31 is inserted into a vertical space formed by the vertical groove 32a of retainer member 32 previously secured to the end wall 14d of casing 14 such that the parallel projections 31a, 31b of interlock plate 31 are positioned respectively between the mounting holes 14a and 14b and between the mounting holes 14b and 14c, and the fork shafts 11, 12, 13 are assembled with the mounting holes 14a, 14b and 14c. If in the assembly process the interlock plate 31 is erroneously inserted into the vertical groove 32a of retainer member 32 in the reverse direction, the end projection 31d of interlock plate 31 is overlapped with the mounting hole 14c as shown in FIG. 4 to disable assembly of the fork shaft 13 with the mounting hole 14c. Thus, an error in assembly of the interlock plate 31 can be easily recognized to prevent the interlock mechanism A from its erroneous assembly.

In operation of the interlock mechanism A, as shown in FIG. 3, the fork shafts 11 and 12 are interlocked by engagement with the parallel projections 31a and 31b of interlock plate 31 at their recesses 11a and 12a, while the fork shaft 13 can be shifted in an axial direction. When the interlock plate 31 is slightly moved upward along with the vertical groove 32a and engaged with the recesses 11a and 13a of fork shafts 11 and 13, axial movement of the fork shafts 11 and 13 is restricted by engagement with the interlock plate 31, while axial movement of the fork shaft 12 is permitted. When the interlock plate 31 is further moved upward and engaged with the recesses 12a and 13a of fork shafts 12 and 13, axial movement of the fork shafts 12 and 13 is restricted by engagement with the interlock plate 31, while axial movement of the fork shaft 11 is permitted.

From the above description, it will be understood that the interlock plate 31 is moved only in one direction along with the vertical groove 32a of retainer member 32 in shifting operation of one of the fork shafts 11, 12 and 13. With such an arrangement of the interlock plate, unexpected troubles in shifting operation of the fork shafts can be avoided in a simple construction.

What is claimed is:

1. An interlock mechanism associated with a shift mechanism for a change-speed gearing in a power transmission, said shift mechanism including three parallel fork shafts axially slidably supported from a casing of said power transmission to be selectively shiftable toward forward speed-ratio and reverse-ratio positions, said casing being formed with an end wall placed in a plane perpendicular to each axis of said fork shafts and to slidably support said fork shafts extending therethrough, wherein said interlock mechanism comprises a single interlock plate assembled with said end wall of said casing to be movable only in one direction, said interlock plate having a body portion slidably guided at a proximal side thereof in said one direction and a pair of spaced parallel projections integrally formed with a distal side of said body portion to be selectively engaged with respective recesses formed on each of said three parallel fork shafts for permitting axial movement of one of said fork shafts and restricting axial movement of the remaining two of said fork shafts.

2. The interlock mechanism recited in claim 1 wherein said body portion of said interlock plate is integrally formed with an end projection to be overlapped with a mounting hole for one of said fork shafts when said interlock plate has been assembled in a reverse direction.

3. The interlock mechanism recited in claim 1, further comprising a retainer member formed with a vertical grove, said retainer member being secured to said end wall of said casing in such a manner as to slidably support said fork shafts extending therethrough, and wherein said interlock plate is inserted into said vertical grove of said retainer member in such a manner that said body portion of said interlock plate is slidably guided by engagement with one side face of said vertical groove.

* * * * *

UNITED STATES PATENT AND TRADEMARK OFFICE
CERTIFICATE OF CORRECTION

PATENT NO. : 5,394,765
DATED : MARCH 7, 1995
INVENTOR(S) : ONO et al.

It is certified that error appears in the above-indentified patent and that said Letters Patent is hereby corrected as shown below:

On the title page, item [30]:
The foreign application priority data should be: 4-099881 instead of:     3-099881

Signed and Sealed this

Fifth Day of December, 1995

Attest:

BRUCE LEHMAN

*Attesting Officer*     *Commissioner of Patents and Trademarks*